(12) United States Patent
Hutchins

(10) Patent No.: US 8,607,746 B2
(45) Date of Patent: Dec. 17, 2013

(54) COOLING SYSTEM EXPANSION TANK

(75) Inventor: William Richard Hutchins, Warwickshire (GB)

(73) Assignee: Land Rover (GB)

( * ) Notice: Subject to any disclaimer, the term of this patent is extended or adjusted under 35 U.S.C. 154(b) by 369 days.

(21) Appl. No.: 12/922,124

(22) PCT Filed: Mar. 9, 2009

(86) PCT No.: PCT/IB2009/050984
§ 371 (c)(1),
(2), (4) Date: Dec. 1, 2010

(87) PCT Pub. No.: WO2009/113019
PCT Pub. Date: Sep. 17, 2009

(65) Prior Publication Data
US 2011/0073597 A1    Mar. 31, 2011

(30) Foreign Application Priority Data

Mar. 10, 2008 (GB) .................................. 0804289.7

(51) Int. Cl.
*F01P 3/22* (2006.01)
*F16K 15/00* (2006.01)
*F16L 55/027* (2006.01)

(52) U.S. Cl.
USPC ........ 123/41.54; 137/455; 137/511; 137/517; 137/519; 137/519.5; 138/37; 138/40; 138/42; 165/42; 220/592.28

(58) Field of Classification Search
USPC ................ 123/41.54; 138/37, 40, 42; 165/42; 137/517, 519, 455, 511, 519.5
See application file for complete search history.

(56) References Cited

U.S. PATENT DOCUMENTS

| | | | | | |
|---|---|---|---|---|---|
| 4,064,848 | A | * | 12/1977 | Pabst et al. ................ | 123/41.54 |
| 4,273,563 | A | * | 6/1981 | Fadda et al. .................... | 96/209 |
| 4,352,342 | A | * | 10/1982 | Cser et al. ................. | 123/41.54 |
| 4,352,683 | A | * | 10/1982 | Vogel .............................. | 96/197 |
| 4,480,598 | A | * | 11/1984 | Berrigan ................... | 123/41.27 |
| 4,755,194 | A | * | 7/1988 | Rooker et al. ................. | 95/258 |
| 4,872,476 | A | * | 10/1989 | Pflum ......................... | 137/513.5 |
| 5,111,776 | A | * | 5/1992 | Matsushiro et al. ....... | 123/41.54 |
| 5,156,680 | A | * | 10/1992 | Orzechowski ................. | 118/46 |
| 5,666,911 | A | * | 9/1997 | Gohl et al. ................. | 123/41.54 |
| 6,216,646 | B1 | * | 4/2001 | Smith et al. ................ | 123/41.54 |
| 6,230,669 | B1 | * | 5/2001 | Evans ......................... | 123/41.5 |
| 6,279,606 | B1 | * | 8/2001 | Hunnicutt et al. ....... | 137/543.19 |
| 6,286,725 | B1 | * | 9/2001 | Gerber .......................... | 222/207 |
| 6,532,910 | B2 | * | 3/2003 | Langervik ................. | 123/41.08 |

(Continued)

FOREIGN PATENT DOCUMENTS

DE         4203161 A1 *  8/1993

*Primary Examiner* — Lindsay Low
*Assistant Examiner* — Tea Holbrook
(74) *Attorney, Agent, or Firm* — Rader, Fishman & Grauer PLLC

(57) ABSTRACT

An expansion tank is disclosed in which a non-return valve is fitted in an outlet port of the expansion tank to limit backflow of coolant into the expansion tank in the event that the pressure in the expansion tank falls below the pressure in a return conduit thereby preventing the expansion tank from filling with coolant. The non-return valve and the expansion tank are formed as a single component and the non-return valve is located in an outlet port of the expansion tank.

21 Claims, 13 Drawing Sheets

(56) References Cited

U.S. PATENT DOCUMENTS

| | | | |
|---|---|---|---|
| 6,708,653 B2* | 3/2004 | Lefrançois et al. | 123/41.54 |
| 6,886,503 B2* | 5/2005 | Langervik | 123/41.05 |
| 7,152,555 B2* | 12/2006 | Langervik | 123/41.08 |
| 7,383,795 B2* | 6/2008 | Lawrence et al. | 123/41.54 |
| 7,441,517 B2* | 10/2008 | Iaffrate et al. | 123/41.54 |
| 7,552,839 B2* | 6/2009 | Padget | 220/564 |
| 7,984,699 B2* | 7/2011 | Theorell | 123/41.01 |
| 8,118,001 B2* | 2/2012 | Kowada | 123/41.54 |
| 2004/0050369 A1* | 3/2004 | Feucht | 123/502 |
| 2009/0020080 A1* | 1/2009 | Kowada | 123/41.08 |

* cited by examiner

COOLING SYSTEM EXPANSION TANK

CROSS-REFERENCES TO RELATED APPLICATIONS

This application is a National Stage application which claims the benefit of International application No. PTCT/IB2009/050984 filed Mar. 9,2009, which claims priority based on Great Britain Application No. 0804289.7,filed Mar. 10,2008, both of which are hereby incorporated by reference in their entirety.

TECHNICAL FIELD

This invention relates to an expansion tank for the cooling system of a liquid cooled internal combustion engine.

BACKGROUND

A typical cooling system expansion tank is a closed vessel which, when the engine is at rest, is only partially filled with liquid coolant, the remainder of the space above the liquid being available for the volumetric expansion of the coolant due to heat. Coolant discharged from the engine flows into the tank above the level of liquid coolant via an inlet port and returns from the bottom of the tank via an outlet port to join the flow of coolant returned to the engine. Such an expansion tank also serves as a means of enabling gases dissolved or trapped in the coolant to rise to the liquid surface and escape hence they are often referred to as a degas tank. Furthermore, air above the liquid surface becomes heated by the incoming coolant, thereby further helping to pressurise the cooling system and prevent cavitation in the pump used to circulate the coolant.

It is a problem with known expansion tanks that under certain conditions coolant can flow back via the outlet port into the tank thereby filling the tank with coolant thereby eliminating or significantly reducing the expansion volume into which gas liberated from the coolant can expand. It is a further problem with such a prior art expansion tank that if the pressure cap is mistakenly removed from a filler neck of the expansion tank while the engine is hot a considerable amount of coolant will be lost as the sudden reduction in system pressure will cause extensive coolant boiling within the system which forces coolant out of the filler neck.

SUMMARY

An object of the present invention is to provide an expansion tank which minimises or eliminates these problems.

According to a first aspect of the present invention there is provided an expansion tank for a cooling system of a liquid-cooled internal combustion engine, the tank comprising a plastic housing having an inlet port for connection to a supply of coolant discharged from the engine and an outlet port located at the bottom of the tank for the return of coolant to the engine, wherein a non-return valve is located in the outlet port to limit coolant backflow into the tank through the outlet port.

The non-return valve may be operable to close off the outlet port when there is a significant negative pressure differential between the tank and a return conduit connecting the outlet port to the cooling system.

The outlet port may have a surface forming a valve seat and the non-return valve may have a valve head shaped for cooperation with the valve seat.

The valve head may be dished having a concave side facing away from the valve seat and a convex side facing towards the valve seat.

The convex side of the valve head may be one of part conical and part spherical.

The non-return valve may have an elongate body connecting the valve head to a retaining means used to retain the non-return valve in the outlet port.

The retaining means may comprise at least two outwardly extending flexible arms attached to one end of the elongate body.

Preferably, the non-return valve is moulded as a single component with the tank.

The non-return valve may be connected to the outlet port by a thin flexible tether.

In an alternative, a flow restrictor may be located in the inlet port which forms a restrictor housing.

The restrictor may comprise a restrictor body fitted inside the restrictor housing wherein the restrictor body is an elongate body having a number of alternating first and second circumferentially extending passages formed therein, each first passage being separated from a respective adjacent second passage by a respective land and at least one transfer passage extending through each land so as to connect the first and second passages on each side of the land and in use produce a momentum loss as the coolant is transferred therethrough.

An outlet end of each transfer passage may be inclined with respect to the flow of fluid through the first and second passages with which it cooperates at an acute angle and an inlet end of each transfer passage is inclined with respect to the flow of fluid through the first and second passages with which it cooperates an obtuse angle.

The inclination of the outlets from the transfer passages may cause fluid to flow in a first direction in the first passages and in a second opposite direction in the second passages.

In another alternative the restrictor may comprises a elongate plastic restrictor body fitted inside the restrictor housing, the restrictor body having a number of alternating first and second circumferentially extending passages formed therein, each first passage being separated from a respective adjacent second passage by a respective land and first and second transfer passages connecting the first and second passages on each side of the land to an internal swirl chamber used to produce a momentum loss as the coolant is transferred through the swirl chamber.

Each first transfer passage may be an inlet passage through which in use fluid flows from one of the circumferentially extending passages into the swirl chamber.

Preferably, the restrictor body is moulded as a single component with the expansion tank.

The restrictor body may be connected to the inlet port by an integrally formed thin flexible tether.

According to a second aspect of the invention there is provided a degas circuit forming part of a cooling system of a liquid-cooled internal combustion engine having an expansion tank constructed in accordance with said first aspect of the invention wherein the inlet port of the tank is connected to the cooling system by a degas conduit at a first point of connection and the outlet port is connected to the cooling system by a return conduit at a second point of connection.

According to a third aspect of the invention there is provided a degas circuit forming part of a cooling system of a liquid-cooled internal combustion engine having an expansion tank constructed in accordance with the first aspect of the invention without a flow restrictor located in the inlet port, wherein the inlet port of the tank is connected to the cooling system by a degas conduit at a first point of connection and the outlet port is connected to the cooling system by a return conduit at a second point of connection and in that a flow control device is located between the expansion tank and the first point of connection.

The flow control device may be a pressure limit valve.

The pressure limit valve may be arranged to maintain a predetermined operating pressure upstream of the valve in the cooling system.

BRIEF DESCRIPTION OF THE DRAWING

The invention will now be described by way of example with reference to the accompanying drawings of which:—

DETAILED DESCRIPTION

Figure 1:
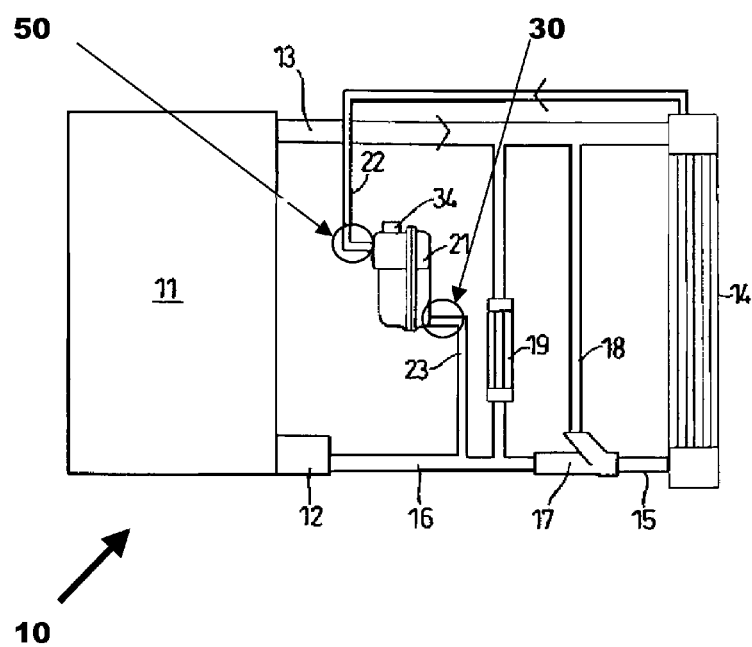
FIG. 1 is a schematic representation of a conventional cooling system for a liquid cooled internal combustion engine incorporating a degas circuit and an expansion tank.

Referring to FIG. 1, a conventional cooling system 10 for an internal combustion engine 11 has a circulation pump 12 which can deliver liquid coolant through the engine 11 to an engine delivery hose 13 and a heat exchanger in the form of a conventional air cooled radiator 14. Flow from the radiator 14 back to the circulation pump 12 passes through a radiator return hose 15, a thermostatically controlled bypass valve 17 and a pump return hose 16.

The bypass valve 17 operates to control flow in the radiator return hose 15 and in a bypass hose 18 such that until the coolant reaches higher temperatures most of the flow of coolant from the engine 11 is through the bypass hose 18 and there is no significant flow through the radiator 14. At higher coolant temperatures, most of the flow passes through the radiator 14.

An expansion tank 21 has a tank feed hose or degas conduit 22 connected at a first point of connection to an upper end of the radiator 14 and a tank return hose or conduit 23 connected at a second point of connection to the pump return hose 16.

A filler port is located on the top of the expansion tank 21 for use in adding coolant to the coolant system 10. The filler port is, as is well known in the art, closed off by a pressure cap 34.

Note that the first point of connection of the degas conduit 22 to the cooling circuit is located vertically higher than the second point of connection of the return conduit 23 to the cooling circuit and that the second point of connection is a location where the pressure in the cooling system is relatively low, that is to say, the second point is a location upstream from or on an inlet side of the circulation pump 12 where the pressure in the cooling system is lowest.

A heater matrix 19 for the heating the vehicle passenger compartment is also shown connected between the engine delivery hose 13 and the pump return hose 16.

The expansion tank 21 is made of a suitable engineering plastic material such as, for example, polyamide, glass reinforced polypropylene or polycarbonate.

Figure 1A:
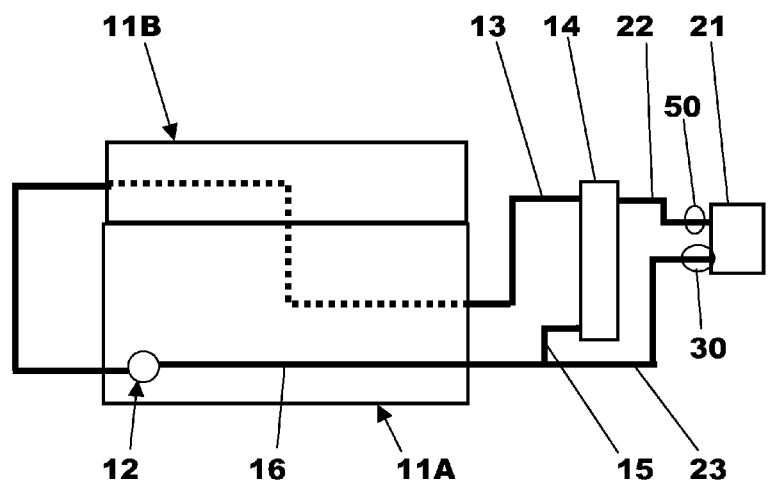
FIG. 1A is a diagrammatic representation of a cooling system that is similar to that shown in FIG. 1 but in which reverse coolant flow is used.

FIG. 1A shows a reverse flow cooling system which has a circulation pump 12 which can deliver liquid coolant through a cylinder head 11B and Cylinder block 11A of an engine to an engine delivery hose 13 and a heat exchanger in the form of a conventional air cooled radiator 14. Flow from the radiator 14 back to the circulation pump 12 passes through a radiator return hose 15, a thermostatically controlled bypass valve (not shown) and a pump return hose 16.

The bypass valve operates as before to control flow in the radiator return hose 15 and in a bypass hose (not shown). As before an expansion tank 21 has a tank feed hose or degas conduit 22 connected at a first point to an upper end of the radiator 14 and a tank return hose or conduit 23 connected at a second point to the pump return hose 16.

The primary difference between this cooling circuit and the circuit shown in FIG. 1 is that coolant flows down from the cylinder head 11B into the cylinder block 11A whereas in the embodiment shown in FIG. 1 the flow is upwards from the cylinder block to through the cylinder head. The invention disclosed herein is equally applicable to both types of cooling system but is described below with respect to a conventional cooling system of the type shown in FIG. 1.

Operation of the conventional cooling system is as follows.

During normal operation of the engine 11, coolant is pumped by the circulation pump 12 through the engine 11 and radiator 14 and back to a low pressure or inlet side of the pump 12. Any gas produced due to cavitation within the cooling system is passed along with coolant through the degas conduit 22 to the expansion tank 21. The gas trapped in the coolant is separated from the coolant in the expansion tank 21 and the coolant flows back via the return conduit 23 to the low pressure side of the circulation pump 12 and back into the main part of the cooling system. During normal use approximately 5% of the total coolant flowing through the coolant system 10 will pass through the expansion tank 21 in this manner.

However, if when the coolant is at normal operating temperature there is a sudden loss in circulation pressure due to a sudden reduction in engine speed, the engine being switched off or the pressure cap 34 being removed then localised boiling of the coolant will occur especially in the hot spots of the engine 11 which are typically in and around the exhaust ports in the cylinder head. The effect of this localised boiling is to rapidly increase the pressure in the cylinder head thereby forcing coolant back into the engine block increasing the risk of cylinder head distortion. In addition, the increased cylinder head coolant pressure will force coolant into the expansion tank 21 from the return conduit 23 thereby filling or substantially filling the expansion tank with coolant. In some cases this backflow will cause coolant to be forced out of the filler port past the pressure cap 34.

This backflow effect is undesirable because it results in a loss of coolant in the cooling system and in the case when the pressure cap has been removed a high risk of scalding to a person who has mistakenly removed the pressure cap. In addition, as soon as the volume of the expansion tank 21 is occupied by coolant there is no volume into which the gas being produced by localised boiling can expand thereby exacerbating the problem.

Figure 2:
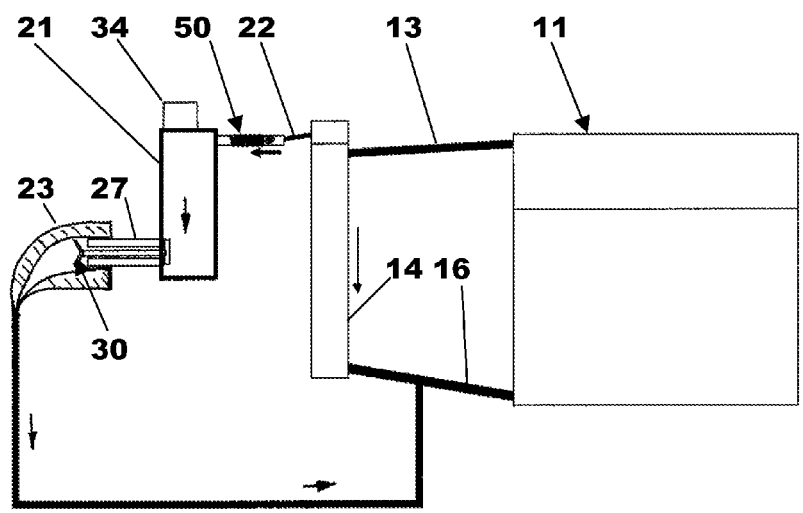
FIG. 2 is a diagrammatic representation of a degas circuit and an expansion tank according to the invention in a first operating state.
Figure 3:
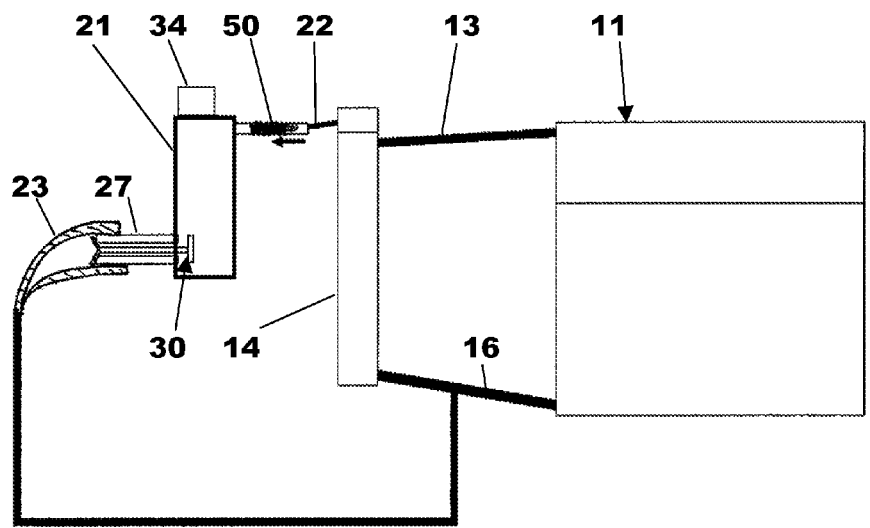
FIG. 3 is a diagrammatic representation of a degas circuit and an expansion tank according to the invention in a second operating state.

Referring now to FIGS. 2 and 3 there is shown a cooling system according to the invention which is in most respects identical to that shown in FIG. 1 with the exception that the expansion tank 21 includes a non-return valve 30 located in an outlet port 27 of the expansion tank 21.

FIG. 2 shows the cooling system during normal operation in which, as before, coolant is pumped by a circulation pump (not shown) through the engine 11 and radiator 14 and back to a low pressure or inlet side of the pump 12. Any gas produced due to cavitation within the cooling system is passed along with coolant through the degas conduit 22 to the expansion tank 21. The gas trapped in the coolant is separated from the coolant in the expansion tank 21 and the coolant flows back via the non-return valve 30 and the return conduit 23 to the low pressure side of the circulation pump 12 and back into the main part of the cooling system.

FIG. 3 shows the situation when the coolant is at normal operating temperature and there is a sudden loss in circulation pressure due to a sudden reduction in engine speed, the engine being switched off or the pressure cap 34 being removed.

In this case the pressure in the expansion tank 21 is lower than the pressure in the return conduit 23, that is to say, a significant negative pressure differential exists between the expansion tank 21 and the return conduit 23 connecting the outlet port 27 to the cooling system. In such a situation coolant tries to backflow into the expansion tank 21 but this reverse flow acts upon the non-return valve 30 causing it to close thereby preventing a significant volume of coolant from entering the expansion tank 21. The expansion tank 21 therefore retains a significant volume that is not occupied by coolant but is occupied by gas or more correctly by steam produced by localised boiling.

The effect of the closing of the non-return valve 30 is that less coolant is able to flow from the cylinder head into the cylinder block thereby reducing the risk of cylinder head distortion. Furthermore, any steam produced in the cylinder head is forced to escape via the degas conduit 22 to the expansion tank 21 as there is no other alternative route and there is a reduced risk of coolant being forced out through the filler port or past the pressure cap 34 if it is in place and so any coolant loss is minimised.

It will be appreciated that, the flow capability of the pressure cap 34 is greater than with coolant due to the lower density of steam compared to coolant and that the latent heat of evaporation of steam is much higher than that of coolant and so a greater reduction in excess engine heat can be obtained by venting steam rather than liquid coolant.

A further advantage of the use of a non-return valve 30 in the outlet port is that the non-return valve 30 is potentially able to pump coolant back into the cooling system during such boiling conditions thereby further minimising the loss of coolant in the cylinder head of the engine.

This is because the steam produced by localised boiling is not produced in a constant manner but in short bursts. The effect of this intermittent steam production is to cause the pressure in the expansion tank to vary or oscillate as the steam is produced in the cylinder head or in any other part of the cooling system. This fluctuating steam production causes the force balance across the non-return valve 30 to change temporarily from a state in which a negative pressure differential exists between the expansion tank 21 and the return conduit 23 thereby holding the non-return valve 30 closed to a state in which a positive pressure differential exists which causes the non-return valve 30 to open allowing coolant to flow from the temporarily higher pressure region within the expansion tank 21 into the return conduit 23 until the negative pressure differential is reinstated. Therefore, in effect, the pulses of steam returning to the expansion tank 21 in combination with the non-return valve 30 act as a pump.

By locating the non-return valve 30 in the outlet port 27 of the expansion tank 21 very little liquid coolant is trapped between the valve head and the expansion tank 21 when the non-return valve closes compared to the situation if the non-return valve is located at a more remote position in the return conduit 23 and so there is less risk of the expansion tank 21 filling with liquid coolant.

Figure 4:
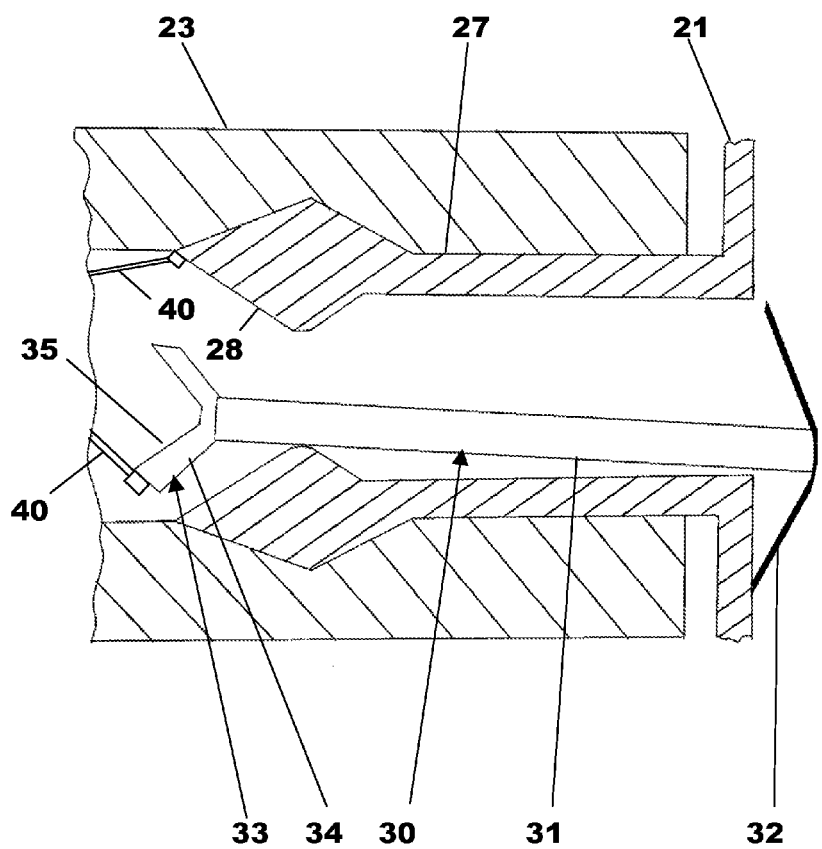
FIG. 4 is an enlarged cross-section through part of the expansion tank shown in FIGS. 2 and 3 showing a non-return valve in an open position.
Figure 5:
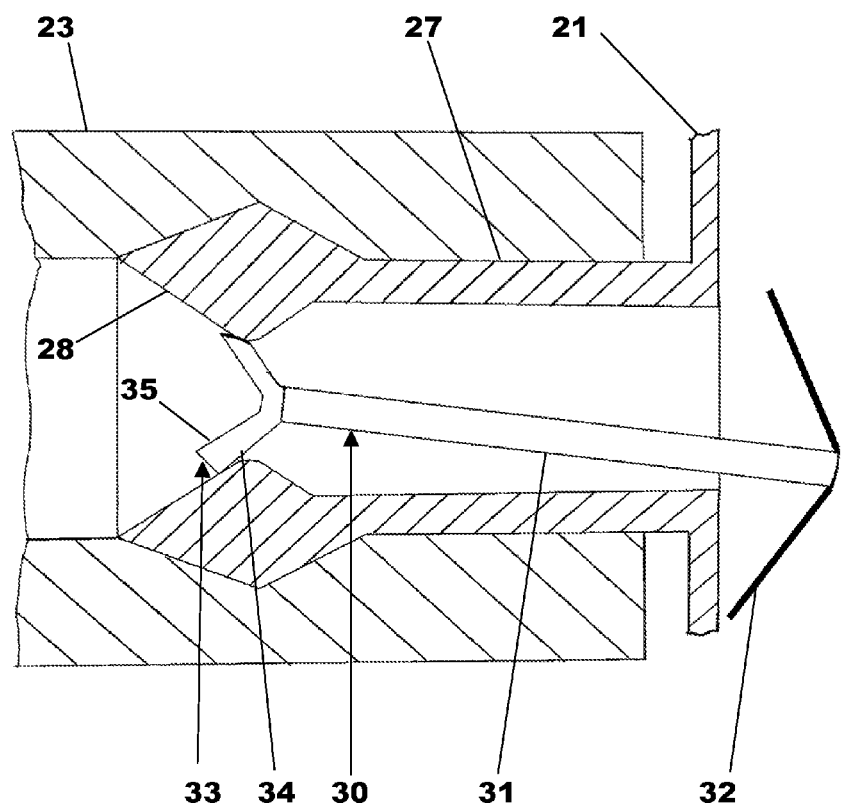
FIG. 5 is a cross-section similar to that shown in FIG. 4 but showing the non-return valve in a closed position.
Figure 6:
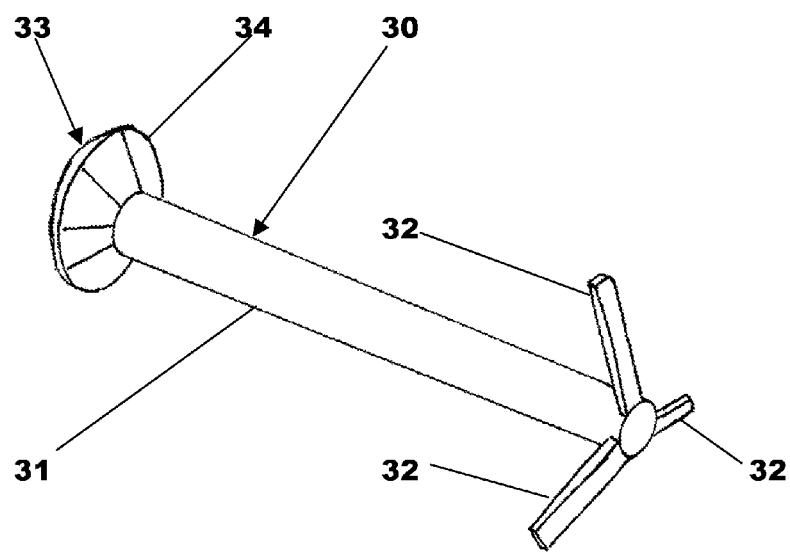
FIG. 6 is a pictorial representation of the non-return valve of FIGS. 2 to 5.

Referring now to FIGS. 4 to 6 there is shown in greater detail a preferred embodiment of non-return valve 30 for use in the degas circuit of the cooling system described above.

The non-return valve 30 has an elongate body 31 connecting a valve head 33 to a retaining means 32 used to retain the non-return valve 30 in the outlet port 27 of the expansion tank 21.

The valve head 33 is dished having a concave side 35 facing away from the outlet port 27 and a convex side 34 facing towards the outlet port 27.

The outlet port 27 has a surface forming a valve seat 28 and the convex side 34 of the valve head 33 is shaped for cooperation with the valve seat 28. As shown, the convex side 34 of valve head 33 is part conical but it could alternatively be part spherical or any other suitable shape to assist the valve head 33 to self align with the valve seat 28 when the non-return valve 30 is moved into its closed position.

At the opposite end of the valve body 31 to the location of the valve head 33 is located the retaining means which in this case is formed by three outwardly extending arms or barbs 32 attached to the end of the elongate body 31. It will be appreciated that the invention is not limited to the use of three arms and that more or less arms could be used or an alternative form of retaining means could be used such as, for example, outwardly biased pins.

However, the use of such flexible arms 32 allows the non-return valve 30 to be easily assembled to the expansion tank 21 by simply pushing the non-return valve 30 into the outlet port 27 until the flexible arms 32 are able to spring back or expand and engage an inner surface of the expansion tank 21.

The non-return valve 30 is made as a single unitary moulded component from the same plastic material as the expansion tank 21 and is preferably moulded as a single component with the expansion tank 21 to which it is connected by a thin tether 40. This has the advantage of reduced manufacturing costs and the elimination of problems associated with losing or failing to fit the non-return valve 30 during assembly of the cooling system 10.

As shown only on FIG. 4, the thin flexible tether 40 connects the non-return valve 30 to an outward end of the outlet port 27 of the expansion tank 21.

It will be appreciated by those skilled in the art that the non-return valve could alternatively be made as a separate component to the expansion tank 21 and that this arrangement would allow existing cooling systems to be adapted to form a system according to the invention by simply inserting a suitably sized non-return valve of the type described above into the outlet port of the existing expansion tank.

Operation of the non-return valve 30 is as follows.

FIG. 2 shows the non-return valve 30 in an open position or state in which coolant can flow from the expansion tank 21 through the return conduit 23 back to the main cooling circuit of the engine 11 during normal operation of the engine 11 with the pump 12 running. In this state, the pressure in the expansion tank 21 is higher than the pressure in the return conduit 23. It will be noted that the valve head 33 is moved clear from the valve seat 28 and that the flexible arms 32 abut against the inner surface of the expansion tank 21 when the non-return valve 30 is in this open state.

In the event that there is a sudden change in cooling system pressure due to a rapid slowing of the engine or the engine being turned off which results in significant boiling in the cylinder head of the engine 11, then the steam produced primarily in the cylinder head will, as previously described, force coolant back through the engine 11 causing the pressure in the return conduit to rise above the pressure in the expansion tank 21.

However, in this case instead of there being a positive pressure differential between the expansion tank 21 and the return conduit 23 there will be a negative pressure differential, that is to say, the pressure in the return conduit 23 will be higher than the pressure in the expansion tank 21. When there is such a significant negative pressure differential between the expansion tank 21 and the return conduit 23 connecting the outlet port 27 to the cooling system the non-return valve 30 is operable to move to the position shown in FIG. 5 so as close off the outlet port 27. A combination of coolant flow impinging upon the concave surface 35 of the valve head 33 and the pressure differential across the valve head 33 causes this closing motion to occur.

As soon as the non-return valve 30 closes so that the convex surface 34 of the valve head 33 abuts against the valve seat 28 no more coolant can backflow through the outlet conduit 23 and enter the expansion tank 21 and so a significant expansion volume remains in the expansion tank 21 into which steam from the boiling can expand.

As noted above, one advantage of the fitment of a non-return valve 30 to the outlet port 27 is that the non-return valve 30 can act as a steam powered pump to cause coolant to be pumped back into the main cooling circuit thereby further reducing the risk of damage to the engine 11 from occurring.

A further advantage is that the risk of significant coolant loss due to boiling is significantly reduced as coolant cannot flow back into the expansion tank 21 after the non-return valve 30 has closed and so any excess pressure vented through the pressure cap 34 will primarily be in the form of gas or steam.

The reference numeral 30 on FIGS. 1 and 1A indicate the position where a non-return valve would be fitted to a conventional cooling system to convert it to a cooling system according to this invention.

Referring back now to FIGS. 2 and 3 there is shown a further improvement over the conventional cooling system shown in FIGS. 1 and 1A in the form of a flow control device 50 located between the expansion tank 21 and the first point of connection of the expansion tank 21 to the main cooling circuit of the cooling system. Preferably the flow control device 50 is formed as part of the inlet port to the expansion tank 21.

In a first embodiment the flow control device is a pressure limit valve (not shown in detail) of conventional ball and spring design. That is to say a ball is held against an orifice by a spring such that when the pressure difference across the ball exceeds a predetermined level the ball is moved away from the orifice thereby allowing fluid to flow through the pressure limit valve and when the pressure differential is insufficient the ball is urged by the spring so as to block the orifice thereby preventing the flow of fluid through the pressure limit valve. The pressure limit valve is arranged in this case to maintain a predetermined operating pressure upstream of the valve in the cooling system. The predetermined pressure is preferably in the range of 500 to 750 kPa (0.5 to 0.75 bar) and in one example is 650 kPA.

The function of the pressure limit valve is twofold firstly to maintain pressure in the cylinder head of the engine 11 when there is sudden drop in cooling system pressure due to a sudden reduction in engine speed and secondly to reduce the loss of coolant from the cooling system if the pressure cap 34 is mistakenly removed when the coolant is hot.

By maintaining a pressure of 650 kPA in the cylinder head the probability of extensive boiling is reduced as is the magnitude of any boiling that does occur and this acts so as to maintain coolant in the cylinder head and particularly near the hot spots of the cylinder head thereby reducing the risk of cylinder head distortion and head gasket damage. It also allows steam to escape from the engine 11 in the same manner as when the engine 11 is running at normal speed namely steam/gas can be expelled past the pressure limit valve into the expansion tank 21 where any entrained coolant can be separated out.

Secondly, in the event of a pressure cap removal, instead of there being a sudden rush of hot coolant out through the filler port on the top of the expansion tank 21, steam will initially be heard escaping past the pressure control valve thereby warning a user of the motor vehicle to which the engine 11 is fitted that the pressure cap 34 needs to be replaced. This reduces both the risk of user injury from escaping hot coolant and also the loss of coolant from the cooling system.

Furthermore because it is primarily steam that is vented into the expansion tank 21 more heat can be removed from the cooling system than is the case with coolant flow due to the higher latent heat of evaporation of steam compared to liquid coolant. In addition, the flow capability of the pressure cap 34 is considerable greater with gas than it is with liquid due to the difference in density between liquid coolant and gas.

One further advantage is that because the pressure limit valve holds pressure in the cylinder head the release pressure of the pressure cap can be reduced as it no longer needs to maintain a high system pressure to limit boiling. The use of a lower system operating pressure reduces the stress on the expansion tank and all of the hoses and conduits making up the cooling system.

With reference to FIGS. 7 to 10 there is shown a second embodiment of a flow control device in the form of a flow restrictor 50.

A degas conduit such as the degas conduit 22 has contradictory requirements, during initial cooling system fill a large volume of air needs to be transported to the expansion tank 21 but during certain times such as engine warm-up the flow to the expansion tank 21 from the main cooling system needs to be limited in order to speed up heating of the coolant. It is therefore common practice to use a restrictor in the degas conduit 22 to minimise these effects.

A conventional single orifice of a suitable size required to meet these conflicting flow requirements to the expansion tank 21 is relatively small (<2 mm diameter) and so is easily blocked by debris circulating through the cooling system. In addition, the small size of the orifice means that very high velocities are produced through the orifice (>10 m/s) and this combination of high velocity and low pressure tends to exacerbate aeration and cavitation and increase potential erosion of wall material.

The inventors have realised that by using momentum loss principles they can construct a restrictor with the required restriction to flow while permitting debris of 2 to 3 mm to pass through without blockage. In addition, due to the larger flow area used in such a device, the flow velocities are reduced and many of the problems associated with the use of a single orifice restrictor can be overcome.

Preferably, the flow restrictor is in the form of a momentum loss flow restrictor in which fluid is caused to flow along a serpentine path through the restrictor thereby dissipating fluid momentum and causing a pressure drop across the restrictor. This type of restrictor has the advantage that the flow path through the restrictor can be relatively large compared to a single orifice.

Figure 7:
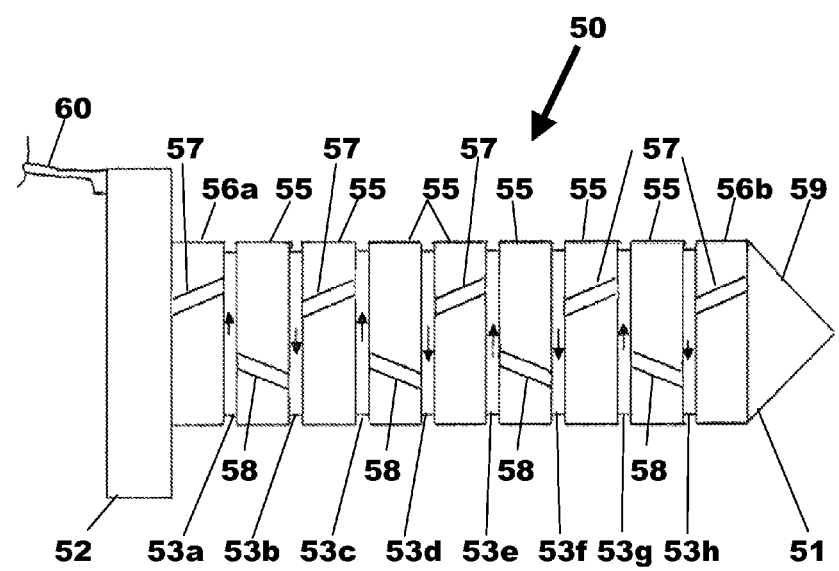
FIG. 7 is a side view of a restrictor body of a flow restrictor for use in the cooling system shown in FIGS. 1 to 3.
Figure 8:
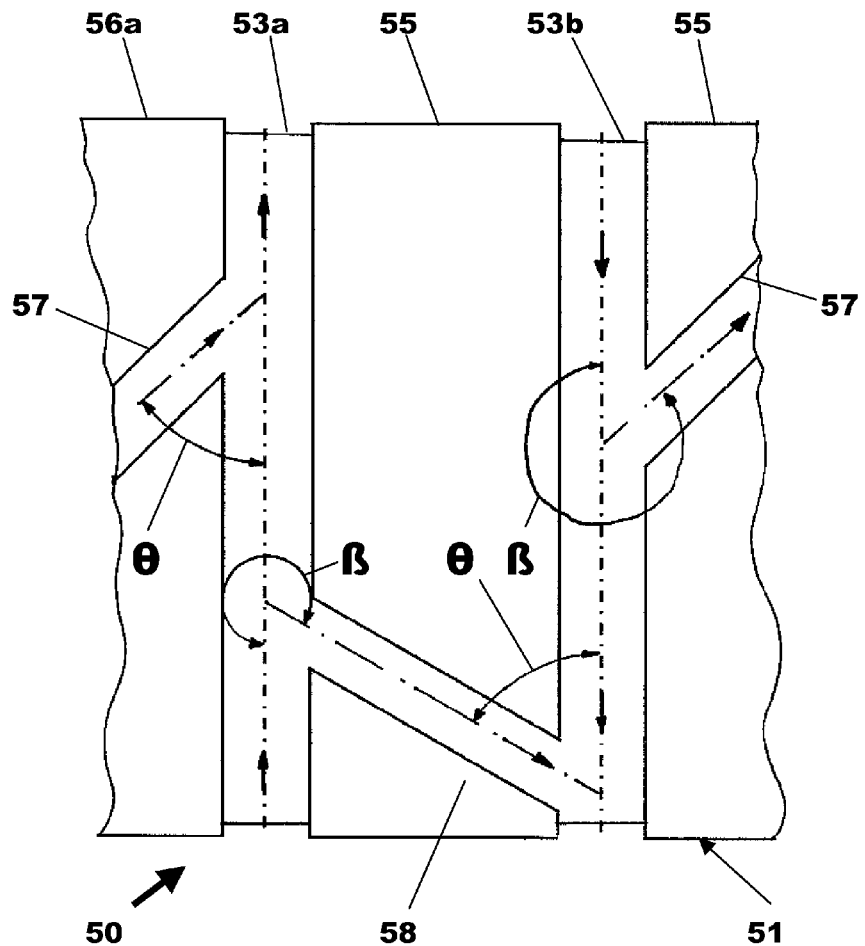
FIG. 8 is an enlarged side view of part of the restrictor body shown in FIG. 7.
Figure 9:
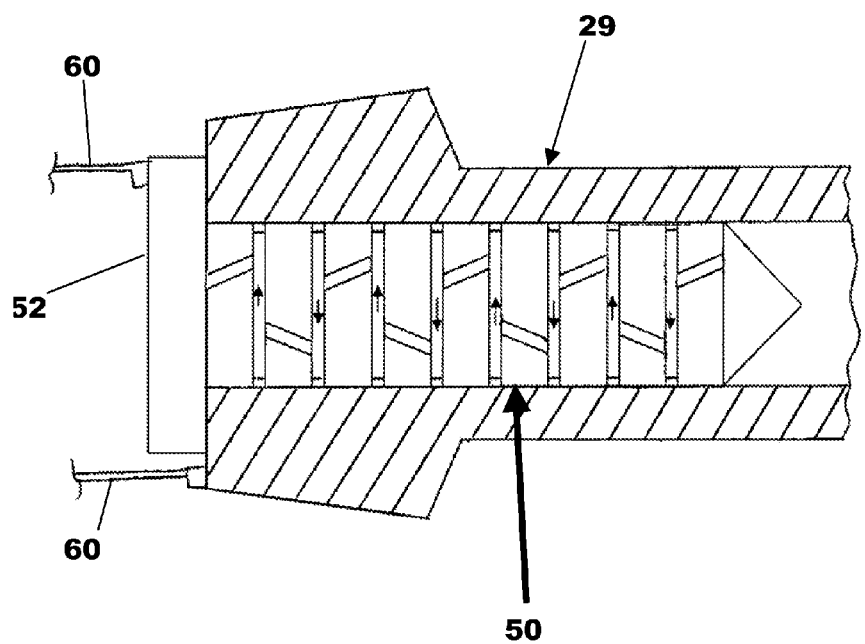
FIG. 9 is a view similar to that of FIG. 7 but showing the restrictor body located in a restrictor housing formed by an inlet port of the expansion tank.

FIGS. 7 to 9 show in detail one embodiment of such a momentum loss flow restrictor. The flow restrictor 50 comprises a restrictor housing which in this case is formed by an inlet port 29 of the expansion tank 21 and a restrictor body 51 fitted inside the restrictor housing 29.

The restrictor body 51 is an elongate body having in this case eight alternating first and second circumferentially extending passages 53a, 53c, 53e, 53g and 53b, 53d, 53f, 53h formed therein. Each of the first passages 53a, 53c, 53e, 53g is separated from a respective adjacent second passage 53b, 53d, 53f, 53h by a respective land 55 and at least one transfer passage 57, 58 extends through each land 55 so as to connect the first and second passages 53a, 53c, 53e, 53g and 53b, 53d, 53f, 53h on each side of the land 55 and produce a momentum loss as the coolant is transferred therethrough.

At an inlet end 52 of the restrictor body 51 there is a terminal land 56a having at least one transfer passage 57. In this case each transfer passage 57 only communicates at one end with a circumferentially extending passage 53a, the other end being arranged to receive a flow of coolant from the cooling system via the degas conduit 22.

At an outlet end 59 of the restrictor body 51 there is a terminal land 56b having at least one transfer passage 57. In this case each transfer passage 57 only communicates at one end with a circumferentially extending passage 53h the other end being arranged to supply a flow of coolant to the expansion tank 21.

One set of transfer passages 57 extend in a helical fashion in one direction about the restrictor body 51 and another set of transfer passages 58 extend in a similar helical fashion in an opposite direction about the restrictor body 51 so as to produce a serpentine like flow effect.

As best viewed with reference to FIG. 8, an outlet end of each transfer passage 55 is inclined with respect to the flow of fluid through the first and second passages 53a, 53c, 53e, 53g and 53b, 53d, 53f, 53h with which it cooperates at an acute angle θ and an inlet end of each transfer passage 55 is inclined with respect to the flow of fluid through the first and second passages 53a, 53c, 53e, 53g and 53b, 53d, 53f, 53h with which it cooperates at an obtuse angle β.

The inclination of the outlets from the transfer passages 55 causes fluid to flow in a first direction in the first passages 53a, 53c, 53e, 53g and in a second opposite direction in the second passages 53b, 53d, 53f, 53h. This is because the momentum of the fluid exiting the transfer passages 55 in combination with the acute angle θ produces a circulatory effect in the passage 53a, 53b, 53c, 53d, 53e, 53f, 53g and 53h that the fluid enters.

However, the obtuse inclination of the inlets to the transfer passages 55 causes a significant loss of fluid momentum as the fluid is transferred from one circumferentially extending passage 53a, 53c, 53e, 53g and 53b, 53d, 53f, 53h to the next circumferentially extending passage 53a, 53c, 53e, 53g and 53b, 53d, 53f, 53h. This is because the fluid has to turn sharply by more than 90 degrees into the inlet of the transfer passage 55 and considerable turbulence or circulation is caused at the inner radius of the turn as the fluid tries to change direction. It will also be appreciated that this turning has the effect of acting as a mini separator and assists with the separation of gas from the coolant as it flows into the expansion tank 21. It will be appreciated that the flow of coolant through the flow restrictor 50 is driven by the pressure differential that naturally subsists between the inlet end 52 and the outlet end 59 of the flow restrictor 50 due to its location in the degas circuit.

It will be noted that the flow of coolant through the flow restrictor 50 follows a serpentine path zigzagging along the length of the restrictor body 51 from one circumferentially extending passage 53a, 53c, 53e, 53g to the next circumferentially extending passage 53b, 53d, 53f, 53h. Although not shown it will also be appreciated that the entry to each transfer passage 57, 58 can be in three dimensions so that, not only does the coolant need to turn sharply as indicated, it also has to move towards or away from a central axis of the restrictor body 51. This could be achieved by using transfer passages 57, 58 and first and second circumferentially extending passages 53a, 53c, 53e, 53g and 53b, 53d, 53f, 53h of varying depth.

Advantageously, the flow restrictor 50 is made from the same plastic material as the expansion tank 21 so that any expansion or contraction of the expansion tank 21 is replicated by the restrictor body 51 and so as to permit the restrictor body 52 to be moulded as a single component with the expansion tank 21.

Preferably, the restrictor body 51 is connected to the inlet port 29 of the expansion tank 21 by an integrally formed thin flexible tether 60 so that the restrictor body 51 cannot be lost in transit and to reduce the risk of a failure to fit the restrictor body 51 into the inlet port 29 upon assembly of the cooling system.

Figure 10:
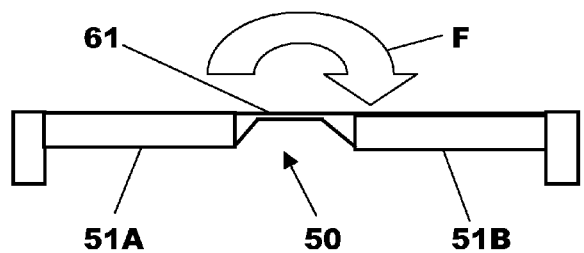
FIG. 10 is a side view of a flow restrictor body made from two parts that are hingedly joined together.
Figure 11:
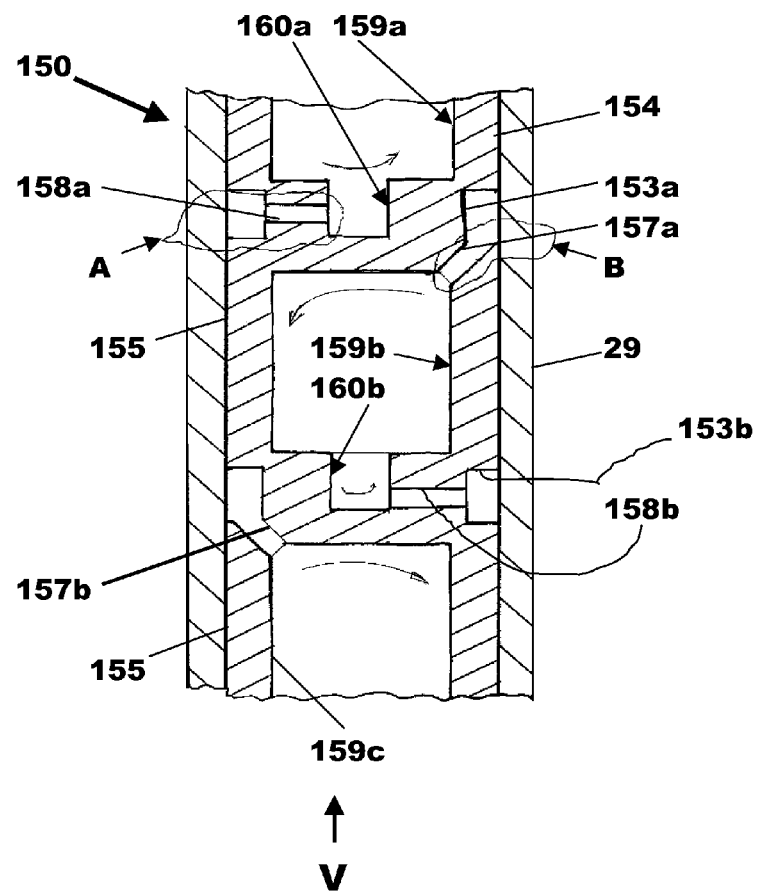
FIG. 11 is a sectional view along the split line S-S shown on FIG. 16 of part of an alternative restrictor body.
Figure 12:
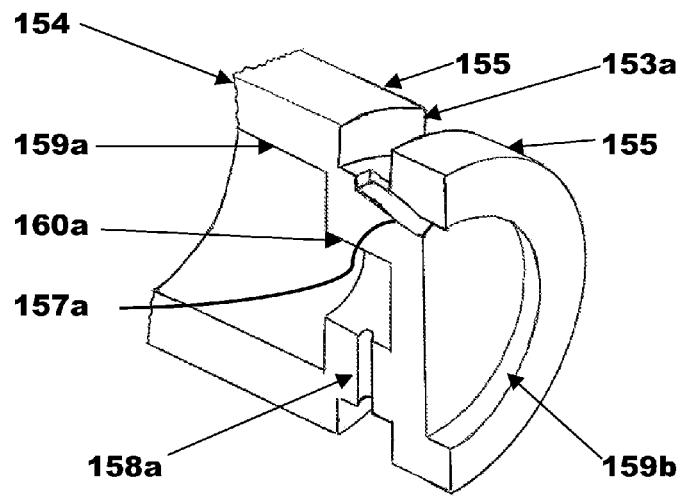
FIG. 12 is a pictorial view of part of the restrictor body shown in FIG. 11.

FIG. 10 shows an alternative restrictor body that is intended to be a direct replacement for the restrictor body 51 described above but which is made as two halves 51A, 51B joined by a flexible link 61. When the two halves are folded together as indicated by the arrow F they form a restrictor body that can be simply inserted into the inlet port 29 in the same manner as that described above. It will be appreciated that one of the two halves 51A, 51B could also have a flexible tether moulded as part of it to connect the restrictor to the expansion tank 21. One advantage of such a construction is that it allows more complex passage shapes and paths to be moulded.

With reference to FIGS. 11 to 16 there is shown another alternative of a flow restrictor 150 which is intended as a direct replacement for the flow restrictor 50 previously described.

The flow restrictor 150 comprises a restrictor housing formed in this case by the inlet port 29 of the expansion tank 21 and a elongate plastic restrictor body 154 fitted inside the restrictor housing 29.

The restrictor body 154 has formed therein a number of alternating first and second circumferentially extending passages of which two passages 153a and 153b are shown.

Each first passage 153a is separated from a respective adjacent second passage 153b by a respective land 155 and first and second transfer passages 157a and 158b connect the first and second passages 153a and 153b on each side of the land 155 to an internal swirl chamber used to produce a momentum loss as the coolant is transferred through the swirl chamber. Each swirl chamber has a large diameter portion 159a, 159b, 159c with which at least one first transfer passage 157a, 157b cooperates and a small diameter portion 160a, 160b with which at least one second transfer passage 158a, 158b cooperates.

Figure 13:
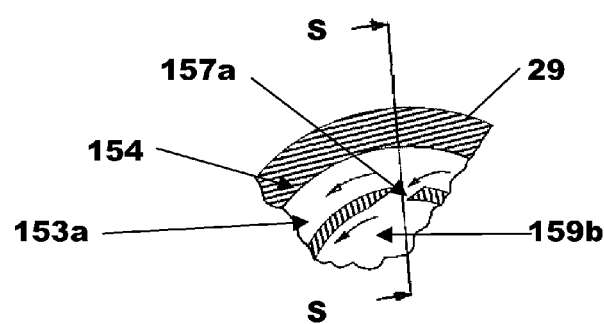
FIG. 13 is a scrap cross section in the region of area B on FIG. 11 showing an inlet passage and the location of the split line S-S.
Figure 14:
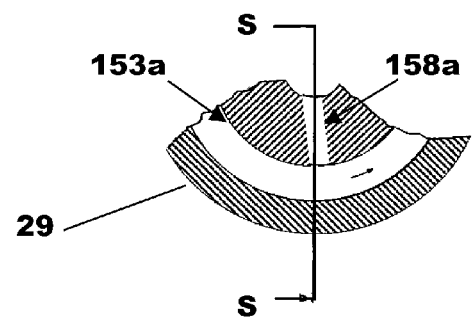
FIG. 14 is a scrap cross section in the region of area A on FIG. 11 showing an outlet passage and the location of the split line S-S.

Each first transfer passage is an inlet passage 157a, 157b through which fluid flows from one of the circumferentially extending passages 153a, 153b into the swirl chamber and each inlet passage 157a, 157b is arranged tangentially with respect to the swirl chamber with which it cooperates so as to generate a circulatory flow within the swirl chamber (see FIG. 13).

Each second transfer passage is an outlet passage 158a, 158b to transfer fluid from the swirl chamber to a circumferentially extending passage 153a, 153b.

It will be appreciated that the restrictor body 154 has a number of swirl chambers spaced out along its length and that fluid flows sequentially through the swirl chambers from one end of the restrictor 150 to an opposite end located closest to the expansion tank.

Preferably, the restrictor body 154 is made from the same plastic material as the expansion tank 21 so that the restrictor body 154 can be moulded as a single component with the expansion tank 21. In addition, it is desirable for the restrictor body 154 to be connected to the outlet port 29 by an integrally formed thin flexible tether (not shown).

Figures 15, 16:
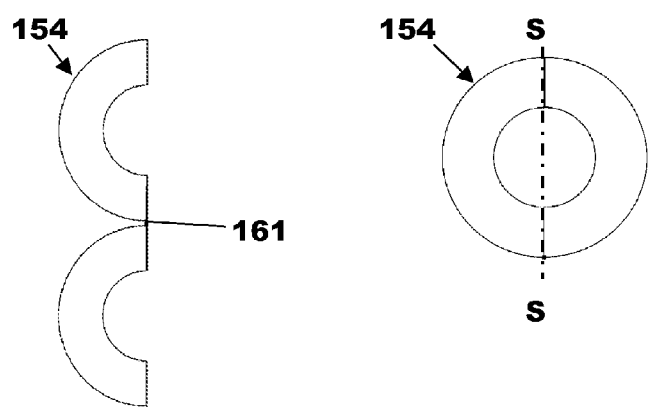
FIG. 15 is an end view of the restrictor body in a manufactured or open state.
FIG. 16 is an end view showing the restrictor body in a closed or in use state.

In order to permit the complex internal shapes of the swirl chamber and the inlet and outlet transfer passages to be simply produced, the restrictor body 154 as shown in FIGS. 15 and 16 is formed of two halves joined along one edge by a flexible hinge 161. The two halves are folded together to form the completed restrictor body 154 (see FIG. 15).

In operation fluid enter each swirl chamber through one of the inlet passages 157a, 157b where due to the high velocity with which the fluid enters and the tangential arrangement of the inlet passages a rotating or vortex flow is formed within the large diameter portion 159a, 159b, 159c of the swirl chamber. The effect of this circulatory flow that it encourages the much denser liquid to be thrown outwardly against the wall of the large diameter portion 159a, 159b, 159c while the lighter gas within the fluid passes with little restriction through the middle or centre of the swirl chamber. The drag created when the heavier liquid impinges against the wall of the swirl chamber reduces the momentum of the liquid as the liquid has to rotate several times before it can reach the outlet passage 158a, 158b from the swirl chamber. In addition, in order for the liquid to reach the outlet passage 158a, 158b it has to climb the step formed due to the difference in diameter of the large and small diameter portions 159a, 159b, 159c and 160a, 160b of the swirl chamber and so further energy is dissipated.

All of the passages within this type of flow restrictor 150 can be large relative to a single orifice thereby reducing the risk of blockage due to debris.

As shown, the arrangement of the inlet passages 157a, 157b is such that the fluid circulates in opposite direction in adjacent swirl chambers but this need not be the case. Similarly the arrangement of the outlet passages 158a, 158b is such that alternating anticlockwise and clockwise rotation of the fluid is produced in the first and second circumferentially extending passages 153a and 153b when viewed in the direction of arrow V on FIG. 11.

The reference numeral 50 on FIGS. 1 and 1A indicates the position where a flow control device would be fitted to a conventional cooling system to convert it to a cooling system according to this aspect of the invention.

The invention claimed is:

1. A tank for a cooling system of a liquid-cooled internal combustion engine, the tank comprising a plastic housing having an inlet port for connection to a supply of coolant discharged from the engine and an outlet port located at the bottom of the tank for the return of coolant to the engine, wherein a non-return valve is located in the outlet port to limit coolant backflow into the tank through the outlet port, wherein the non-return valve is molded as a single component, and wherein the outlet port has a surface forming a valve seat and the non-return valve has a valve head shaped for cooperation with the valve seat and wherein the valve head is dished having a concave side facing away from the valve seat and a convex side facing toward the valve seat.

2. A tank as claimed in claim 1 wherein the non-return valve is operable to close off the outlet port when there is a negative pressure differential above a threshold between the tank and a return conduit connecting the outlet port to the cooling system.

3. A tank as claimed in claim 1 wherein the convex side of the valve head is one of part conical and part spherical.

4. A tank as claimed in claim 1 wherein the non-return valve has an elongate body connecting the valve head to a retainer used to retain the non-return valve in the outlet port.

5. A tank as claimed in claim 4 wherein the retainer comprises at least two outwardly extending flexible arms attached to one end of the elongate body.

6. A tank as claimed in claim 1 wherein the non-return valve is connected to the outlet port by a thin flexible tether.

7. A tank as claimed in claim 1 wherein a flow restrictor is located in the inlet port which forms a restrictor housing.

8. A tank for a cooling system of a liquid-cooled internal combustion engine, the tank comprising a plastic housing having an inlet port for connection to a supply of coolant discharged from the engine and an outlet port located at the bottom of the tank for the return of coolant to the engine, wherein a non-return valve is located in the outlet port to limit coolant backflow into the tank through the outlet port, wherein the non-return valve is molded as a single component, wherein the outlet port has a surface forming a valve seat and the non-return valve has a valve head shaped for cooperation with the valve seat wherein the valve head is dished having a concave side facing away from the valve seat and a convex side facing toward the valve seat;

wherein a flow restrictor is located in the inlet port which forms a restrictor housing; and wherein the restrictor comprises a restrictor body fitted inside the restrictor housing wherein the restrictor body is an elongate body having a number of alternating first and second circumferentially extending passages formed therein, each first passage being separated from a respective adjacent second passage by a respective land and at least one transfer passage extending through each land so as to connect the first and second passages on each side of the land and in use produce a momentum loss as the coolant is transferred therethrough.

9. A tank as claimed in claim 8 wherein an outlet end of each transfer passage is inclined with respect to the flow of fluid through the first and second passages with which it cooperates at an acute angle and an inlet end of each transfer passage is inclined with respect to the flow of fluid through the first and second passages with which it cooperates at an obtuse angle.

10. A tank as claimed in claim 9 wherein the inclination of the outlets from the transfer passages causes fluid to flow in a first direction in the first passages and in a second opposite direction in the second passages.

11. A tank as claimed in claim 8 wherein the restrictor body is molded as a single component with the expansion tank.

12. A tank as claimed in claim 11 wherein the restrictor body is connected to the inlet port by an integrally formed thin flexible tether.

13. A tank for a cooling system of a liquid-cooled internal combustion engine, the tank comprising a plastic housing having an inlet port for connection to a supply of coolant discharged from the engine and an outlet port located at the bottom of the tank for the return of coolant to the engine, wherein a non-return valve is located in the outlet port to limit coolant backflow into the tank through the outlet port, wherein the outlet port has a surface forming a valve seat and the non-return valve has a valve head shaped for cooperation with the valve seat wherein the valve head is dished having a concave side facing away from the valve seat and a convex side facing toward the valve seat;

wherein a flow restrictor is located in the inlet port which forms a restrictor housing; and wherein the restrictor comprises an elongate plastic restrictor body fitted inside the restrictor housing, the restrictor body having a number of alternating first and second circumferentially extending passages formed therein, each first passage being separated from a respective adjacent second passage by a respective land and first and second transfer passages connecting the first and second passages on each side of the land to an internal swirl chamber used to produce a momentum loss as the coolant is transferred through the swirl chamber.

14. A tank as claimed in claim 13 wherein each first transfer passage is an inlet passage through which in use fluid flows from one of the circumferentially extending passages into the swirl chamber.

15. A tank circuit as claimed in claim 14 wherein each inlet passage is arranged tangentially with respect to the swirl chamber with which it cooperates so as to generate a circulatory flow within the swirl chamber.

16. A tank as claimed in claim 14 wherein the second transfer passage is an outlet passage to transfer fluid from the swirl chamber to a circumferentially extending passage and wherein each swirl chamber has a large diameter portion with which at least one inlet transfer passage cooperates and a small diameter portion with which at least one outlet transfer passage cooperates.

17. A tank as claimed in claim 13 wherein the second transfer passage is an outlet passage to transfer fluid from the swirl chamber to a circumferentially extending passage.

18. A tank as claimed in claim 13 wherein the flow restrictor includes at least two swirl chambers spaced out along its length.

19. An expansion tank for a cooling system of a liquid-cooled internal combustion engine, the tank comprising a plastic housing having an inlet port for connection to a supply of coolant discharged from the engine and an outlet port for connection to a return line through which coolant returns to the engine, wherein the tank has a top and a bottom, wherein the outlet port is located at the bottom of the tank, wherein a non-return valve is located in the outlet port to limit coolant backflow into the tank through the outlet port, wherein the non-return valve has an elongate body connecting the valve head to a retainer used to retain the non-return valve in the outlet port, and wherein the retainer comprises at least two outwardly extending flexible arms attached to one end of the elongate body.

20. An expansion tank for a cooling system of a liquid-cooled internal combustion engine, the tank comprising a plastic housing having an inlet port for connection to a supply of coolant discharged from the engine and an outlet port for connection to a return line through which coolant returns to the engine, wherein the tank has a top and a bottom, wherein the outlet port is located at the bottom of the tank, wherein a non-return valve is located in the outlet port to limit coolant backflow into the tank through the outlet port, and wherein a flow restrictor is located in the inlet port which forms a restrictor housing, wherein the restrictor comprises a restrictor body fitted inside the restrictor housing, wherein the restrictor body is an elongate body having a number of alternating first and second circumferentially extending passages formed therein, each first passage being separated from a respective adjacent second passage by a respective land and at least one transfer passage extending through each land so as to connect the first and second passages on each side of the land and in use produce a momentum loss as the coolant is transferred therethrough, wherein the non-return valve is molded as a single component, wherein the outlet port has a surface forming a valve seat and the non-return valve has a valve head shaped for cooperation with the valve seat and wherein the valve head is dished having a concave side facing away from the valve seat and a convex side facing toward the valve seat.

21. A tank as claimed in claim 20 wherein the restrictor body is connected to the inlet port by an integrally formed thin flexible tether.

* * * * *